July 13, 1954 E. O. KEIZER 2,683,803

METHOD OF AND MEANS FOR AMPLIFYING PULSES

Filed Sept. 27, 1950

INVENTOR
Eugene O. Keizer
BY
ATTORNEY

Patented July 13, 1954

2,683,803

UNITED STATES PATENT OFFICE 2,683,803

METHOD OF AND MEANS FOR AMPLIFYING PULSES

Eugene O. Keizer, Princeton, N. J., assignor to Radio Corporation of America, a corporation of Delaware Application September 27, 1950, Serial No. 186,966

4 Claims. (Cl. 250—27)

This invention relates to condenser charging systems and more particularly to a method of and means for establishing an amplified charge on a condenser which corresponds in amplitude and polarity with a pulsed direct current voltage.

In the field of electronic regulation there are many occasions in which control voltages are produced in the form of pulses of direct current the amplitude and polarity of which determine the degree and direction of correction to be applied to the device being regulated.

One instance of such a case is in television where the synchronization of the deflection generators of the receivers must be maintained exactly in step with the corresponding generators of the transmitter. One way by which this has been accomplished in the past is described in U. S. Patent 2,339,536, granted January 18, 1944, to K. R. Wendt. Here, the incoming synchronizing pulses are compared with the phase of the local deflection oscillations to produce a series of pulses which are applied to the local oscillator in such amplitude and polarity as to correct the frequency of the local oscillator. A somewhat similar procedure is followed in telegraphy where it is necessary to maintain the recording and transmitting devices in exact synchronism.

While these and similar systems have operated satisfactorily in the past to accomplish their desired purpose under conditions where the amplitude of the control signals has been sufficient without amplification, in those cases where amplification of the control voltage is necessary, it has been obtained only at the cost of undue complication of the circuits involved.

One means which has been tried is an amplification of the pulses used for comparison before phase detection occurs. This has not proven entirely satisfactory for the reason that any phase shift produced in the amplification of one comparative pulse has to be applied in an identical fashion to the other comparative pulse. These requirements have limited the usefulness of such systems.

Another means for accomplishing the desired amplification is to amplify the produced control pulses. Since the control pulses must of necessity be in the form of direct current of varying amplitude and polarity, prior systems have used direct current amplifiers. The use of such amplifiers introduces other complications such as the inherent instability of such amplifiers and their susceptibility to the amplification of hum.

Accordingly, it is an object of this invention to provide a simple method and means whereby control pulses of varying amplitude and polarity may be accurately amplified and stored on a condenser.

Another object of the invention is to provide a method and means for producing amplified control pulses which will be stable in operation.

Briefly, in accordance with the invention, the control pulses are fed to an amplifier having a tank circuit resonant to the pulse repetition rate. There is thus set up in the tank circuit amplified sine waves which are in phase with the control pulses. By charging a condenser by these waves only during a portion of their cycle, preferably at their peak amplitude, there will appear across the condenser amplified pulses in corresponding polarity.

The above and other objects and advantages of the invention will become apparent upon a consideration of the following detailed description taken in conjunction with the accompanying drawing in which.

For the purposes of illustration, the invention will be described in connection with a television receiver. It will be obvious that the arrangement is equally adaptable to the transmitter and that it could be readily used in other devices requiring the use of direct current pulses.

Figure 1:
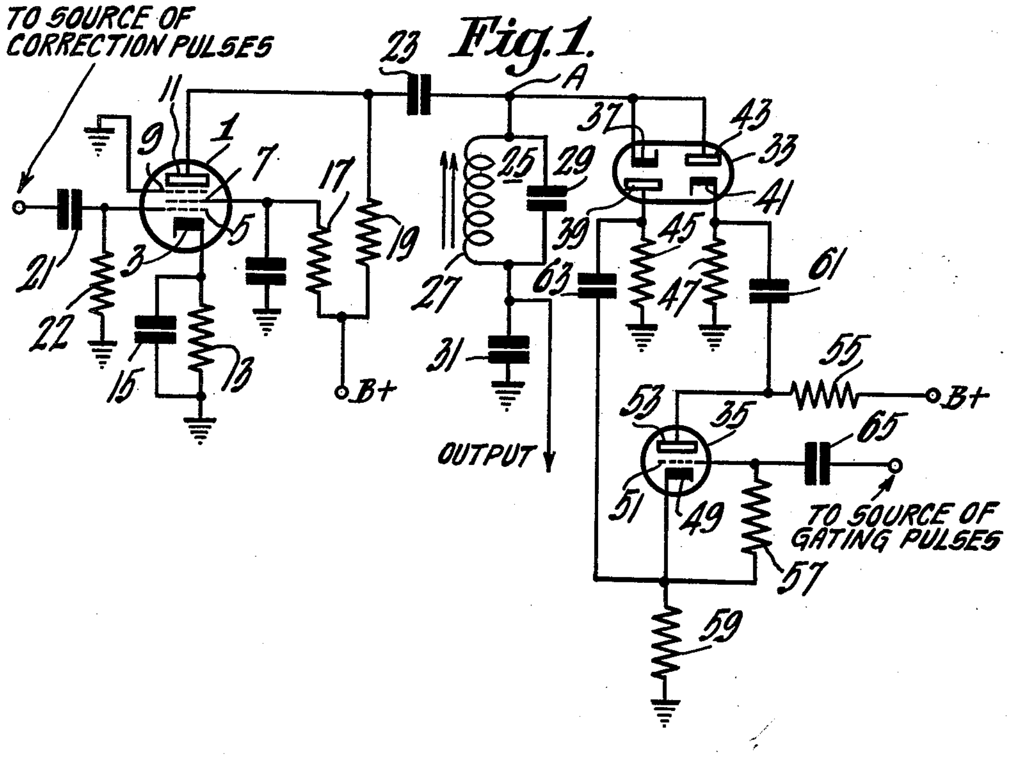
Fig. 1 represents schematically one embodiment of the invention.

Referring to Fig. 1, it will be seen that there has been provided an amplifying device 1, which for purposes of illustration has been shown as a pentode vacuum tube having a cathode 3, a control grid 5, a screen grid 7, a suppressor grid 9, and a plate 11. The cathode is connected to ground through a bias resistor 13, shunted by a by-pass condenser 15. Positive potential is applied to the screen grid and plate through line resistors 17 and 19 respectively. The suppressor grid, as is customary, is maintained at ground level. The operation of this type of amplifier is well known and is not believed to require explanation. It will be understood that any other suitable type of amplifier could be used.

Control pulses are fed through the coupling condenser 21 and develop a potential across the grid resistor 22, which is applied to the control grid of the amplifier. The voltages produced on the plate as a result of the control pulses applied to the grid are fed through blocking condenser 23, to a resonant circuit 25. This circuit consists of a coil 27 in parallel with a condenser 29.

The circuit has been shown as being tuned by an iron core in the inductance. However, any desired means of tuning may be used such as taps on the coil or a variable condenser. As a result of the tuned tank circuit, the amplifier operates as an amplifier of alternating currents and hence is free from the instability and susceptance to hum of the customary direct current amplifier.

The output from the above circuit is obtained across a storage condenser 31, in series with the resonant circuit and ground.

Considering the type of control pulses applied to the grid of the amplifier, it will be clear that for maximum efficiency they should be indicative of two types of information. They should indicate the degree of a synchronization as well as the direction of a synchronism. These two types of information are usually given by varying the amplitude of the pulses in direct ratio of the amount of a synchronization while the polarity varies in accordance with whether the controlled device is ahead or behind the reference device. It will also be clear that in an automatic system the control pulses will be generated at a fixed recurring rate. For these reasons, the resonant circuit 25, is tuned to the recurrence rate.

Figure 2:
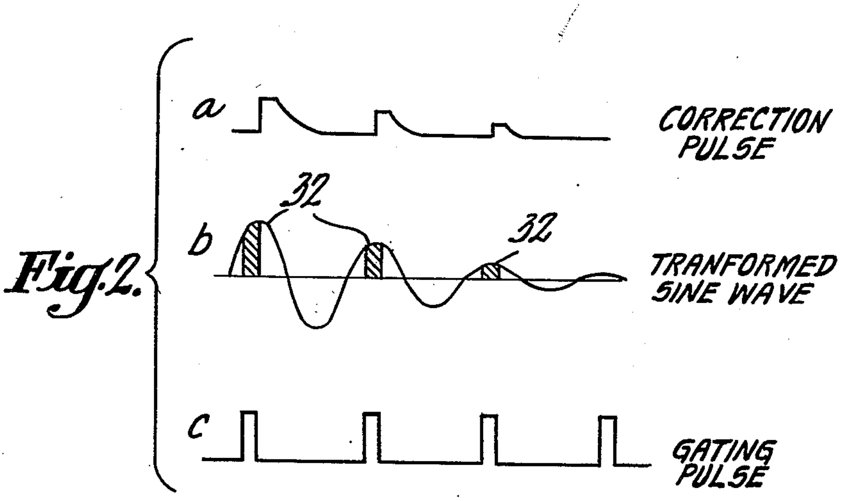
Fig. 2 represents characteristic curves of voltages appearing at selected points in the circuit.

Referring now to Fig. 2, the curve "a" represents in exaggerated form a series of control pulses applied to the grid of the amplifier. It will be noted that the pulses are of decreasing amplitude. This is because of the fact that each pulse produces some correction, hence, not as much correction will be required at the time of the next pulse. Thus, not only will correction be most forcibly applied when most needed, but the reduction in correction values as synchronism is approached will reduce the tendency of the system to hunt. While all the pulses of curve "a" are shown of one polarity, it will be understood that if the controlled oscillator were out of phase in the opposite way, pulses of reverse polarity would be produced.

Curve "b" of Fig. 2 represents the sine waves which would result in the resonant circuit 25, from the application of control pulses such as shown on curve "a." It will be noted that wave "b" has peak amplitudes 32, which are in phase with the control pulses and which correspond in polarity. It will be understood that were the control pulses of opposite polarity as indicated above, the peak amplitudes of the sine wave in the resonant circuit 25, would still be in phase therewith and of corresponding polarity.

Referring again to Fig. 1, it will be clear that in the absence of any other factor, the sine waves applied to the storage condenser 31, would not charge that condenser. However, in accordance with the invention, only a portion of the sine wave is allowed to charge the condenser.

A further consideration of curve "b" of Fig. 2 indicates that if charging potentials from the induced sine waves were applied to the storage condenser 31 only during the portion of the wave indicated by the cross-hatching under the peak amplitudes 32, the resultant charge on the condenser would be indicative of both the amplitude and polarity of the control pulses.

In order to accomplish this result the invention makes use of a gated double diode circuit similar to that disclosed in U. S. Patent 2,332,681, granted October 26, 1943, to K. R. Wendt.

This circuit comprises the double diode tube 33, and the gating tube 35. The tube 33 includes a pair of diodes. The cathode 37 of one diode is directly connected to the plate 43 of the other diode and to the blocking condenser 23. The plate 39 of the first mentioned diode has its plate connected through the biasing resistor 45 to ground, while the cathode 41 of the other diode is connected to ground through a bias resistor 47. While the diodes have been shown as being contained in a single envelope it will be obvious that separate diodes may be used and further that any suitable rectifiers may be substituted therefor.

The gating tube 35 has been shown as a triode having a cathode 49, a grid 51 and a plate 53. Positive operating potentials are applied to the plate through a variable resistor 55. A grid resistor 57 is connected between grid and cathode and the cathode is connected to ground through the unbypassed resistor 59.

The cathode of the gating tube is connected in series with a condenser 61 to the plate 39 of one of the diodes. The plate of the gating tube is connected in series with a condenser 63 to the cathode 41 of the other diode. Gating pulses are fed to the grid of the gating tube through a coupling condenser 65.

The operation of the gated double diode circuit is as follows. Gating pulses which are derived from any suitable source and which are in synchronism with the controlled device, as shown in curve "c" of Fig. 2, are applied to the grid of the gating tube. These pulses appear in phase but in opposite polarity across the condensers 61 and 63 connected to the clamping tube and establish a bias on the diodes such that during periods of non-gating time the diodes cannot conduct. Thus the charge on the storage condenser cannot change during the time the gating tube is blocked and its level remains clamped at whatever its charge was during the previous gating period. As the gating tube is unblocked by the application of a gating pulse a discharge path for the storage condenser is formed and, since the diodes are connected back-to-back the discharge can be in either direction. However, at this time a charging voltage is being applied to the storage condenser from the sine wave in the resonant circuit and which corresponds in amplitude form and polarity to the control pulse applied to the grid of the amplifier. The storage condenser therefor assumes a corresponding charge which is similarly held during the next portion of the cycle while the gating tube is blocked.

It will be seen that the invention provides for utilizing direct current pulses of a fixed recurrence rate, changing the pulses to alternating current waves having amplitude peaks of corresponding phase and polarity and charging a condenser from the waves during only a portion of their cycle.

What is claimed is:

1. An electrical control comprising in combination a resonant circuit, a storage capacitor, an electrical clamp circuit, said clamp circuit having an output circuit and a control connection, a plurality of points of potential fixed with respect to each other, said resonant circuit said storage capacitor and said electrical clamp circuit connected serially between two points of fixed potential, means for applying a first train of electrical pulses to said resonant circuit and means for applying a second train of electrical pulses to said clamp circuit control connection.

2. An electrical control circuit comprising in combination a source of signal pulses occurring at a regular rate, a resonant circuit having a plurality of different terminals, said resonant circuit responsive to the rate of recurrence of said pulses, said resonant circuit coupled to said source of signal pulses to receive energy therefrom, two points of fixed potential, a storage capacitor, said storage capacitor connected between one of said resonant circuit terminals and one of said points of fixed potential, an electrical clamp circuit, said electrical clamp circuit connected between one of said points of fixed potential and a resonant circuit terminal other than that terminal to which said storage capacitor is connected, a source of gating pulses, said gating pulses recurring at substantially the same frequency as said signal pulses, means for controlling said clamp circuit with said gating pulses in order that said clamp circuit will be effective to connect said resonant circuit terminal to said point of fixed potential only during time intervals recurring at the frequency of said gating pulses, and an output circuit for said control circuit connected across said storage condenser.

3. The invention as set forth in claim 2 and wherein said clamp circuit consists of a pair of oppositely polarized diodes biased to conduction by said gating pulses to provide for clamping action in both polarities.

4. The invention as set forth in claim 3 and wherein the amplitude of said signal pulses varies in amplitude in accordance with control information.

References Cited in the file of this patent

UNITED STATES PATENTS

| Number | Name | Date |
|---|---|---|
| 2,277,000 | Bingley | Mar. 17, 1942 |
| 2,335,265 | Dodington | Nov. 30, 1943 |
| 2,468,058 | Grieg | Apr. 26, 1949 |